United States Patent
Giannattasio et al.

(10) Patent No.: US 11,584,839 B2
(45) Date of Patent: Feb. 21, 2023

(54) PROCESS FOR THE PRODUCTION OF AN ADDITIVE FOR BITUMINOUS CONGLOMERATES WITH HIGH MECHANICAL PERFORMANCES

(71) Applicant: ITERCHIMICA S.R.L., Suisio (IT)

(72) Inventors: Federica Giannattasio, Suisio (IT); Sergio Cisani, Bergamo (IT); Elisa Bertuletti, Suisio (IT)

(73) Assignee: ITERCHIMICA S.R.L., Suisio (IT)

( * ) Notice: Subject to any disclaimer, the term of this patent is extended or adjusted under 35 U.S.C. 154(b) by 907 days.

(21) Appl. No.: 16/434,618

(22) Filed: Jun. 7, 2019

(65) Prior Publication Data
US 2020/0354541 A1    Nov. 12, 2020

(30) Foreign Application Priority Data

May 7, 2019  (IT) .................. 102019000006600

(51) Int. Cl.
*C08J 11/06*  (2006.01)
*C08L 95/00* (2006.01)

(52) U.S. Cl.
CPC ............... *C08J 11/06* (2013.01); *C08L 95/00* (2013.01); *C08J 2300/30* (2013.01); *C08J 2367/02* (2013.01); *C08J 2395/00* (2013.01); *C08J 2400/30* (2013.01); *C08J 2467/02* (2013.01); *C08L 2555/34* (2013.01)

(58) Field of Classification Search
CPC ....................................................... C08L 95/00
See application file for complete search history.

(56) References Cited

U.S. PATENT DOCUMENTS

| | | | | |
|---|---|---|---|---|
| 5,252,641 A | * | 10/1993 | Dawans | C08J 11/06 52/68 |
| 2009/0163625 A1 | * | 6/2009 | Lang | C08L 95/00 524/68 |

FOREIGN PATENT DOCUMENTS

WO    2015179553 A2    11/2015

* cited by examiner

*Primary Examiner* — Arrie L Reuther
(74) *Attorney, Agent, or Firm* — Lucas & Mercanti, LLP

(57) ABSTRACT

The present invention refers to a process for the production of an additive composition intended to be mixed into a bituminous conglomerate for road paving. The process includes grinding a mixed waste material containing a mixture of plastic materials, which includes at least one plastic material based on a polyolefin thermoplastic material, washing the ground mixed waste material and separating a portion of low-density material which contains the plastic material based on a polyolefin thermoplastic polymer from the mixed waste material. This portion of low-density material is then ground to a particle size between 10 mm and 20 mm; and then mixed with a material based on polyvinyl butyral. The resultant mixture is further ground to produce an additive composition having a particle size between 4 mm and 6 mm.

20 Claims, No Drawings

PROCESS FOR THE PRODUCTION OF AN ADDITIVE FOR BITUMINOUS CONGLOMERATES WITH HIGH MECHANICAL PERFORMANCES

CROSS-REFERENCE TO RELATED APPLICATIONS

This application claims the benefit of priority from Italian Patent Application No. 102019000006600 filed May 7, 2019, the contents of which are incorporated herein by reference.

FIELD OF APPLICATION

The present invention refers to the technical field of the production of additives for bituminous conglomerates, suitable for providing a road paving.

In particular, the invention refers to a process for the production of an additive composition for bituminous conglomerates from a recovery and/or recycle plastic material.

Specifically, the present invention also relates to an additive composition thereby obtainable, which allows to improve the mechanical performances of the bituminous conglomerate comprising said additive, as well as prolonging the lifetime of the road paving made with such bituminous conglomerate.

BACKGROUND OF THE INVENTION

The need to develop technologies and products as much environmentally friendly as possible is still actual, especially in the field of asphalt and bituminous conglomerates production, in particular by using renewable or eco-friendly raw materials.

In such branch of the art has also become very important the need to optimize production processes both of bituminous conglomerates and of the necessary components for the formulation thereof, reducing the overall exploitation of raw materials, thus of the carbon footprint attributable to such processes.

It is further well known in the art the use of additives for improving the performances of bituminous conglomerates, and of asphalts in general, for example such additives may be compositions comprising thermoplastic polymers or elastomers used for improving the mechanical properties of the bituminous conglomerate containing such additives, such as the breaking strength, and for reducing deterioration in bituminous conglomerate, typically used as covering surface for roads.

A composition of asphalt, comprising aggregates, granular or powder material deriving from rubber scrap, for example tire scrap, and a mixture of thermoplastic polymers and co-polymers, as well as additional additives and filling materials, is described in the international patent application WO2015179553.

The application US 2009/016325 relates to a high-performance bituminous mixture comprising mineral aggregates covered with a composition of thermoplastic polymers, mainly comprising polyvinyl butyral.

Specifically, such composition may comprise a recovery or recycle thermoplastic polymer, including recycled polyvinyl butyral from recycling of glass panels used in the field of construction industry and automotive windscreens.

In any case, although the additives for improving the chemical and mechanical properties of the commercially available asphalts, as well as the asphalts which may be made therewith, are in general produced keeping in mind the environmental impact, for example using scrap materials from other industrial processes or recycle materials, the processes to obtain such materials are still not capable to best combine the need to considerably reduce the environmental impact in the production of said additives with the mechanical properties of road paving made using bituminous conglomerates formulated by adding said additives.

Indeed, the need of finding a virtuous way to dispose and reuse scrap or waste plastic material, both recyclable and not, is becoming of the utmost importance.

In particular, in Europe, and not only there, the need to find an alternative destination for waste of the above-mentioned type is of the highest importance, since on the one hand in many areas of the continent there is not a sufficient number of plants for the recovery of said waste and/or waste-to-energy plants for said waste, while on the other one a reuse of the same is searched, which has a lower environmental impact compared to the incineration or disposal in landfill.

In addition, it has to be considered that the percent amount of recycle plastic compared to virgin plastic used for making mass-consumption items is not proportional to the increase of volumes of plastic recycled and selected thanks to an increasingly efficient collection system based on waste sorting.

Accordingly, plastic remaining from these recovery processes or the like, as well as the quantity of non-recycled plastic, is necessarily disposed by means of waste-to-energy processes, delivery to landfill or, less frequently, for the production of alternative fuels.

In the light of the above presented prior art, the problem underlying the present invention was to develop a process for producing an additive composition for bituminous conglomerates starting from waste plastic material, which provides for the reuse of a wide variety of waste materials, thereby being more environmentally sustainable, as well as it allows to produce a composition having high added value, especially suitable for the use as an additive for the formulation of high performance bituminous conglomerate mixtures.

SUMMARY OF THE INVENTION

Said problem was solved by a process for the production of an additive composition intended to be mixed into a bituminous conglomerate for road paving comprising the following steps:

a) providing a mixed waste material containing a mixture of plastic materials, wherein said mixture of plastic materials comprises at least one plastic material based on a polyolefin thermoplastic polymer;

b) grinding said mixed waste material until a particle size between 40 mm and 80 mm has been reached, preferably a particle size equal to about 60 mm;

c) washing the thus ground mixed waste material and separating in a controlled manner a portion of low-density material from said mixed waste material, wherein said portion of low-density material comprises said at least one plastic material based on a polyolefin thermoplastic polymer;

d) grinding said portion of low-density material until a particle size between 10 mm and 20 mm has been reached, preferably a particle size between 12 and 15 mm; and, e) mixing said portion of low-density material so ground with a material based on polyvinyl butyral (PVB) and grinding the mixture so obtained, in order to produce an additive composition having a particle size between 4 mm and 6 mm, preferably a particle size equal to about 4 mm.

According to the present invention, with the expression "waste mixed material" is meant a mixture of coarse-grained solid residues, i.e. solid residues having particle size generally higher than or equal to 60 mm, wherein said mixture comprises solid residues in turn comprising one or more plastic materials, eventually said mix comprises solid residues consisting of composite materials, i.e. containing a plastic material and a solid material having different chemical nature, for example paper, cardboard or metal, for example aluminum.

In particular, said mixed waste material may comprise solid residues made of plastic material, which result from urban solid wastes or from industrial or handcrafted productions of items made of plastic material or any combination thereof, said solid residues being not recovered or not recoverable in the recycling chain of plastic materials.

Specifically, said plastic material residues may derive from waste comprising the so-called "hard plastics", i.e. solid and stiff plastic materials, generally not recovered nor recoverable in the recycling chain of plastic materials, such as toys, pens, markers and writing material made of plastic materials, flip-flops, bins and baskets made of plastic, fruit crates, pipes, tables and chairs made of plastic, garden furniture, buckets, washbowls and basins, cases for audiocassettes, CDs, DVDs, videocassettes and similar items. Said items are normally collected together with wastes which are not collected by waste sorting in the door to door collection of urban solid wastes or together with bulky waste in the town ecological platforms.

In accordance with the present invention, said plastic material residues may derive from waste which had been previously totally or partially deprived of residues consisting of polyvinyl chloride and of incidental, undesired materials such as paper, cardboard, wood, fabrics, metal or glass.

In any case, said mixed waste material may comprise a minor quantity of solid residues consisting of materials other than plastic, for example paper, cardboard, wood, metal or glass.

To summarize, the present process allows to recover and reuse said mixed waste material normally disposed in landfill or sent to incinerator, obtaining a considerable advantage from an environmental standpoint.

Finally, according to the present invention, with the term "particle size" is meant a numerical range which comprises the minimum value and the maximum value of the diameter of the granules/chip which constitute the waste mixed material, the material of such low-density portion and the additive composition obtainable by the process according to the present invention.

Advantageously, the process according to the present invention allows to produce an additive composition which may be added to a bituminous conglomerate mixture, obtaining a high performance bituminous conglomerate mixture.

In fact, when the bituminous conglomerate mixture containing the additive composition obtainable by the process according to the present invention is used to make a road paving, the latter has improved mechanical characteristics, if compared to a road paving made with a bituminous conglomerate mixture which does not comprise the present additive composition.

Consistently, the above-mentioned additive composition can be easily dispersed in the additional ingredients necessary for the formulation of a bituminous conglomerate mixture, including bitumen and aggregates, resulting in an advantage in terms of a practical use of the additive composition, as well as—exactly because of its high homogeneity and distribution in the conglomerate mixture, the additive mixture allows to obtain a road paving with improved mechanical characteristics by using a conglomerate mixture so modified.

Preferably, in said step a) of providing a mixed waste material, said mixture of plastic materials comprises plastic materials comprising at least a polymer selected from the group consisting of polyethylene, a polyethylene co-polymer, polypropylene, a polypropylene co-polymer, polyethylene terephthalate, acrylonitrile butadiene styrene (ABS), polycarbonate, polystyrene, polyurethane and any combination thereof.

In an equally preferred manner, in said step a) of providing a mixed waste material said polyolefin thermoplastic polymer is selected from the group consisting of polyethylene, a polyethylene co-polymer, polypropylene, a polypropylene co-polymer and any combination of these materials.

More preferably, polyethylene may be high density polyethylene and/or low density polyethylene.

In fact, such materials have a softening point between 120-180° C. and may thus be directly added to the aggregates and to the bitumen, by the so-called "dry method", during the production of bituminous conglomerate.

Advantageously, the additive mixture obtainable by the present process may thus be effectively hot-mixed with bitumen and aggregates, therefore already during the step of formulation of the bituminous conglomerate.

Differently, in accordance with the traditional "wet method", the conventional additives are necessarily mixed at first with only bitumen at a higher temperature, usually at a temperature higher than 180° C., for example between 180-200° C. The bitumen thereby mixed with the additive is then normally maintained at temperature until the next mixing with the aggregates, so as to obtain the bituminous conglomerate ready to be laid onto the road.

To summarize, the additive mixture obtainable by the present process results in a higher practicality of use and an energy saving, if compared to traditional additive mixtures.

The additive mixture obtainable by the present process further requires a reduced melting and mixing time, allowing to mix the materials which constitute the bituminous conglomerate in times which do not exceed one minute, so as to be immediately laid onto the road.

Preferably, said mixed waste material is previously subjected to a preliminary step of separation during which possible fractions made of polyvinyl chloride (PVC) and/or fractions made of unwanted materials such as paper, cardboard, wood, fabrics, metal or glass are removed.

In equally preferred manner, in said step b) of grinding, once ground, said mixed waste material is subjected to a procedure of separating a metallic fraction, possibly comprised therein, more preferably said procedure of separating the metallic fraction from said mixed waste material so ground comprises a first step of separation using magnetic means (deferrization) and a second step of separating the non-ferrous metallic fraction.

Preferably, said step c) of washing and separating is carried out by means of a technique of density separation, selecting a predetermined limit density value and separating from said mixed waste material a portion of low-density material having a density which is lower or equal to said limit value.

In particular, as it will be clear below with reference to the detailed description, during said step c) of washing and separating carried out by means of a technique of density separation, the plastic materials of said mixed waste material are separated by decantation, using a solution having a density equal to a preset value.

Specifically, said density separation is carried out using an aqueous solution having a density equal to a preset value which is between the density value of said at least one plastic material based on a polyolefin thermoplastic polymer comprised in said portion of low-density material of said mixture of plastic materials and the density values of the materials comprised in said mixed waste material with a density value higher than the density of said at least one plastic material based on a polyolefin thermoplastic polymer.

Thereby, in said step c) of washing and separating it is possible to effectively and precisely separate said low-density portion from mixed waste material deprived of said portion of low-density material.

Preferably, depending on the application of the desired additive composition, for example depending on the specific type of bituminous conglomerate which ca be obtained by using the additive composition, in said step c) of washing and separating, a predetermined limit density value is selected and a portion of low-density material is separated, which has a density which is lower or equal to said limit value, wherein said predetermined limit density value is lower or equal to 1.2 kg/m$^3$, more preferably lower or equal to 1.1 kg/m$^3$, most preferably lower or equal to 1.0 kg/m$^3$.

More preferably, said portion of low-density material, so separated in said step c) of washing and separating, has an average density between 0.65 kg/m$^3$ and 0.95 kg/m$^3$, preferably between 0.70 kg/m$^3$ and 0.90 kg/m$^3$, as determined according to the DIN 55990 procedure.

According to a preferred embodiment, said portion of low-density material, so separated in said step c) of washing and separating, may comprise at least one plastic material based on a polyolefin thermoplastic polymer—said polyolefin thermoplastic polymer being preferably polyethylene, a polyethylene co-polymer, polypropylene, a polypropylene co-polymer or any mixture thereof—in a quantity higher than or equal to 75% by weight on the total weight of said portion of low-density material, more preferably in a quantity higher than or equal to 80% by weight on the total weight of said portion of low-density material, even more preferably in a quantity higher than or equal to 85% by weight on the total weight of said portion of low-density material, most preferably in a quantity higher than or equal to 90% by weight on the total weight of said portion of low-density material.

In equally preferred manner, said portion of low-density material, so separated in said step c) of washing and separating, may comprise polystyrene and/or polyurethane in a quantity lower or equal to 15% by weight on the total weight of said portion of low-density material, preferably in a quantity lower or equal to 10% by weight on the total weight of said portion of low-density material, more preferably in a quantity lower or equal to 5% by weight on the total weight of said portion of low-density material.

According to a preferred embodiment, in said step c) of washing and separating, a second mixture of plastic materials comprising at least one plastic material based on a polyolefin thermoplastic material may be added and mixed with said mixed waste material, preferably said second mixture comprising a quantity equal to at least 75% by weight of its total weight of said at least one plastic material based on a polyolefin thermoplastic material, more preferably a quantity equal to at least 80% by weight of its total weight, even more preferably a quantity equal to at least 85% by weight of its total weight.

According to the present invention, said second mixture of plastic materials comprises residues made of plastic material, which result from recoverable wastes, in particular residues from the processing of wastes which are recyclable and are collected by waste sorting.

Specifically, said residues made of plastic material, which result from recoverable wastes, are normally disposed and recovered in the collection based on waste sorting of plastic and sent to the recycling chain, such as packaging made of plastic, mixed packaging, for example films made of more than one plastic material or composite material, and mixtures thereof.

Preferably, in said step c) of washing and separating, said second mixture of plastic materials comprises plastic materials comprising at least a polymer selected from polyethylene, a polyethylene co-polymer, polypropylene, a polypropylene co-polymer, polyethylene terephthalate, polystyrene, polyethylacrylate (PEA), polymethylacrylate (PMA), polybutylacrylate (PBA) or any combination thereof.

In a totally preferred manner, said residues of plastic material comprised in said second mixture of plastic material may be scrap from processes of recovery of recyclable waste made of plastic material or of composite material, disposed and recovered in the collection based on waste sorting of plastic.

In an equally preferred manner, said residues of plastic material comprised in said second mixture may be swarf from industrial and/or handcrafted production of items made of plastic material.

In a totally preferred manner, said second mixture of plastic materials is added to said mixed waste material in a quantity between 5-35% by weight on the weight of said mixed waste material, preferably in a quantity between 10-30% by weight on the weight of said mixed waste material.

Advantageously, the present process may thus provide for the possibility to add, in said step c), a further portion of waste material, i.e. said second mixture of plastic materials, to said mixed waste material, so as to allow to reuse materials which are often normally disposed in landfill or sent to incinerator, obtaining a further advantage from an environmental standpoint.

Advantageously, by adding said second mixture of plastic materials in said step c), it is possible to produce an additive composition enriched with plastic materials, possibly not comprised in said mixed waste material. In this way, depending on the need of application, for example depending on the required mechanical properties which the bituminous conglomerate mixture, to which said composition may be added, in said step c) may be added a second mixture of plastic materials with a specific composition.

Preferably, said step d) of grinding the portion of low-density material is carried out by water granulation, possibly by a water grinding mill.

Preferably, in said step e) of grinding and mixing, said material based on polyvinyl butyral, with which said portion of low-density material is mixed, has a particle size between 10 mm and 20 mm, more preferably between 12 mm and 15 mm.

According to a preferred embodiment, said material based on polyvinyl butyral added in said step e) to said portion of low-density material may comprise a quantity of polyvinyl butyral (PVB) higher than or equal to 80% by weight on the total weight of said material based on polyvinyl butyral, preferably a quantity higher than or equal to 90% by weight on the total weight of said material based on polyvinyl butyral, more preferably a quantity higher than or equal to 95% by weight on the total weight of said material based on polyvinyl butyral.

In equally preferred manner, in said step e) of grinding and mixing, said material based on polyvinyl butyral, with which said portion of low-density material is mixed, is a recovery material based on polyvinyl butyral.

Preferably, said recovery material based on polyvinyl butyral results from post-consumer waste items including automotive windscreens, double-glazed windows, panes of thermal glass, panes of safety glass and/or results from swarf (or cut-offs) from industrial manufacturing for the production of the above-mentioned items, more preferably it results from automotive windscreens.

More preferably, said recovery material based on polyvinyl butyral may also comprise elastomers including natural rubber, butadiene and styrene foam, ethylene-propylene diene monomer (EPDM) rubber, nitrile rubber (nitrile butadiene rubber, NBR) or any combination thereof.

Alternatively, in said step e) of grinding and mixing, said material based on polyvinyl butyral is virgin polyvinyl butyral or a mixture between the above-mentioned recovery material and virgin polyvinyl butyral.

Advantageously, the process according to the present invention thus allows to recover scrap materials resulting from the above-mentioned waste items from processing of glass waste or from replacement of car windscreens, which are normally sent to waste-to-energy processes since the presence of considerable glass percentage makes difficult their recovery, resulting in an advantage not only from the economic standpoint compared to disposal by waste-to-energy processes, but also from the environmental standpoint.

Moreover, the present process allows to produce an additive composition of the above-mentioned type, with high performances, capable of conferring marked characteristics of resilience to the bituminous conglomerate to which it is added in the use thanks to the direct action of polyvinyl butyral.

Moreover, similarly to the plastic material contained in such portion of low-density material, polyvinyl butyral allows to increase the resilience values of the road paving build with the above-mentioned bituminous conglomerate.

According to an embodiment of the present process, before being mixed with said portion of low-density material in said step e) of grinding and mixing, said recovery material based on polyvinyl butyral is subjected to the following steps:
- performing a preliminary grinding of post-consumer waste items or swarf from industrial manufacturing comprising polyvinyl butyral (PVB) until reaching a particle size lower or equal to 30 mm;
- separate glass residues from said waste items so ground, so as to obtain a recovery material based on polyvinyl butyral (PVB) comprising a quantity of glass lower or equal to 10% by weight on said recovery material, preferably lower or equal to 7% by weight on said recovery material, more preferably lower or equal to 5% by weight on said recovery material;
- grinding said recovery material until reaching a particle size between 10 mm and 20 mm, preferably a particle size between 12 and 15 mm; and, In an equally preferred manner, said material based on polyvinyl butyral is added to said portion of low-density material in a quantity equal to 5-25% by weight on the weight of said portion of low-density material, preferably equal to 10-20% by weight on the weight of said portion of low-density material.

Thereby, the process according to the present invention allows to recover said recovery material based on polyvinyl butyral (PVB), obtaining a high performance additive composition of the above-mentioned type, comprising a definitely minimal quantity of glass, which does not impair the workability of the bituminous conglomerate mixture, to which the present additive composition is added, nor the mechanical characteristics of the road paving obtainable with such bituminous conglomerate mixture.

Preferably, the present process comprises the further step of drying the above-mentioned additive composition.

In an equally preferred manner, the process according to the invention further comprises the step of mixing said additive composition with a modifier compound, wherein said modifier compound is preferably selected from graphene, an adhesion enhancer, a regenerating agent, a plasticizer, lignin or any combination thereof.

In a totally preferred manner, said modifier compound may be a compound of synthetic, mineral or vegetable origin.

In accordance with the present invention, with the term "graphene" is meant a carbon material with two-dimensional structure of carbon monoatomic layers with hexagonal matrix, wherein each carbon atom is bound to other three carbon atoms by a covalent bond and bound to the atoms of the adjacent layers by Van Der Waals forces, as well as it is meant any functionalized derivative of such carbon material, for example graphene oxide, i.e. graphene partially functionalized with oxygen comprising groups.

Preferably, the graphene used according to the process of the present invention has an apparent density between 2 and 100 g/dm$^3$, more preferably between 10 and 70 g/dm$^3$; at the same time, graphene used in the additive composition according to the present invention has a superficial area between 10 and 300 m$^2$/g.

Said superficial area is measured by means of a BET method by absorption of inert gas (nitrogen), in particular according to the procedure ISO 9277:2010.

Further, the lateral dimensions of the layers of the graphene used according to the process of the present invention are smaller than 200 μm, preferably smaller than 100 μm, more preferably smaller than 50 μm.

According to a preferred embodiment, graphene according to the process of the present invention is recycle graphene, virgin graphene or a mixture of recycle graphene and virgin graphene.

In a completely convenient manner, when graphene is added to the above-mentioned additive composition obtainable by the process according to the present invention, an additive composition with even higher performances is obtained. In particular, graphene allows to increase resilience values and, more in general, the mechanical properties of the road paving built with a bituminous conglomerate to which such graphene comprising additive composition is added.

According to a preferred embodiment of the invention, the present process comprises the following additional steps:
- feeding the above-mentioned additive composition in an extruder, preferably a twin-screw extruder;
- heating said additive composition up to a predetermined temperature;
- extruding and cooling said additive composition in order to obtain an additive composition in form of extruded granules having a particle size between 1.85 mm and 4.5 mm, preferably between 2 mm and 4 mm.

Advantageously, according to this last embodiment, the process according to the present invention allows to provide an additive composition in form of granules having a size which is practical to use, in particular regarding the flowability properties of the composition and its delivery speed when it is added to the bituminous conglomerate mixture.

According to an alternative embodiment, the present process comprises an additional step of further grinding the above-mentioned additive composition in order to obtain an additive composition in form of fine granules having a particle size between 0.85 mm and 2.5 mm, preferably between 1 mm and 2 mm.

Advantageously, according to this last embodiment, the process according to the present invention allows to provide an additive composition for the formulation of high-performance bituminous conglomerates. The additive composition may be effectively mixed with the additional ingredients necessary for the formulation of bituminous conglomerates, such as bitumen and aggregates.

In fact, the above-mentioned additive composition in form of fine granules proves to be even easier to disperse in the additional ingredients necessary for the formulation of a bituminous conglomerate mixture, including bitumen and aggregates.

Moreover, the above-mentioned additive composition in form of fine granules is in any case safe to handle, because it is free from fine powders, which might be inhaled by the operators who use it.

Preferably, the above-mentioned additional step of grinding the additive composition in order to obtain an additive composition in form of fine granules may comprise a sieving step, in order to remove the fraction of additive granules with a diameter smaller or equal to about 0.85 mm.

In an equally preferred manner, once the above-mentioned additive composition in form of extruded granules or in form of fine granules has been obtained, the process of the invention may comprise an additional step of adding to the additive composition a modifier compound, wherein said modifier compound is selected from graphene, an adhesion enhancer, a regenerating agent, a plasticizer, lignin or any combination thereof.

In a totally preferred manner, said modifier compound may be a compound of synthetic, mineral or vegetable origin.

According to a more preferred embodiment of the invention, the process according to the present invention comprises the following additional steps:

dosing a predetermined quantity of the above-mentioned additive composition in form of fine granules and pressing it;

coating the so pressed additive composition with a plastic material film which is based on a thermoplastic polymer, wherein said plastic material is preferably polyethylene, thus obtaining a capsule.

Preferably, the above-mentioned step of dosing comprises a step of adding to the additive composition a predetermined quantity of a liquid modifier compound, more preferably wherein the latter is selected from an adhesion enhancer, a regenerating agent, a plasticizer, lignin or any combination thereof.

In a totally preferred manner, said modifier compound may be a compound of synthetic, mineral or vegetable origin, for example said plasticizer may be an oil of vegetable origin, more specifically said oil of vegetable origin may be a fatty acid ester or a mixture of fatty acid esters.

More preferably, during said step of dosing said predetermined quantity of additive composition is between 10 g and 20 g.

In other words, according to this preferred embodiment of the present process, it is possible to obtain a capsule comprising said additive composition in form of fine granules coated by a plastic material film.

Advantageously, said additive composition in form of capsules is particularly suitable for the formulation of high-performance bituminous conglomerates; in fact, said capsule may be effectively added by mixing with the additional ingredients necessary for the formulation of bituminous conglomerates, such as bitumen and aggregates.

In particular, when said additive composition in form of capsules is added to heated aggregates and bitumen, said plastic material film is conveniently melted and disintegrated, allowing the granules of the additive to be effectively dispersed directly in the formulation of bituminous conglomerate during the step of mixing.

Said procedure of dispersion directly into the conglomerate formulation provides for short times, generally less or equal to 60 seconds, if compared to the processes of dispersion in bitumen of the additives according to the prior art, resulting in a noteworthy advantage, not only practical, but also a considerable energy and cost saving.

Moreover, exactly because of its form as capsules comprising a predetermined, suitably dosed quantity of additive composition, the latter embodiment allows to provide an additive for bituminous conglomerates which is in turn easier to be dosed, for example by means of pneumatic dosing devices, compared to additive compositions in form of powder or granules, namely not in form of capsules.

The above-mentioned technical problem was also solved by an additive composition intended to be mixed in a bituminous conglomerate for road paving and suitable to improve the mechanical properties of said bituminous conglomerate, comprising at least one polyolefin thermoplastic polymer and polyvinyl butyral (PVB), obtainable by the above process.

Preferably, the above-mentioned additive composition has a melt flow index (MFI) calculated according to the methodology ISO 1133 at a temperature of 190° C. with a load of 2.16 kg between 2 g/10 min and 5 g/10 min, more preferably between 2 g/10 min and 3 g/10 min.

In particular, also due to the specific melt flow index which characterizes the present additive composition, the latter is found to be capable of being effectively dispersed in the additional ingredients necessary for the formulation of a bituminous conglomerate mixture, including bitumen and aggregates, resulting in an advantage in terms of a practical use of the composition.

In addition, because high homogeneity and distribution of the additive composition in the conglomerate mixture can be achieved, the additive composition allows to obtain a road paving with improved mechanical characteristics by using a conglomerate mixture thereby modified.

As previously disclosed in connection to the process according to the present invention, the above-mentioned additive composition has the following advantages:

it comprises materials derived from a mixture of plastic materials, not recovered or not recoverable in the recycling chains of plastic materials according to the current technological standards, allowing for the recovery and the reuse of waste materials otherwise intended for disposal in landfill or waste-to-energy processes;

it may comprise materials derived from a second mixture of plastic material, which may be residues of plastic materials derived from recyclable waste, in particular residues of processing of said recyclable wastes collected by waste sorting;

it may comprise recovered polyvinyl butyral, resulting in a further advantage from both the economic and the environmental standpoint;

it comprises a mixture of different plastic materials, which can be chosen depending on the need on application, for example depending on the desired mechanical properties of the bituminous conglomerate mixture, to which it may be added;

it contains a mixture of plastic materials individually having a melting point considerably lower than similar additives according to the prior art, being thereby capable of being mixed with the bitumen and the aggregates directly at the moment of the formulation of the bituminous conglomerate mixture, immediately before the laying onto the road;

it has a particle size which guarantees an easy dispersion inside the bituminous conglomerate mixture, which, once it has been spread and has solidified, causes the formation of a road paving with improved mechanical characteristics, exactly because of the homogeneous distribution of the additive composition in the conglomerate mixture.

The characteristics and the advantages of the present invention will be further highlighted by some embodiments thereof, which are hereinafter exposed by way of illustration and not of limitation.

DETAILED DESCRIPTION

Outlined below is a way of performing the process according to the present invention to produce an additive composition for high performance bituminous conglomerates. An example follows, in which the mechanical properties regarding a bituminous conglomerate obtained by using an additive composition according to the present invention are evaluated.

Example 1: Obtaining an Additive Composition According to the Process of the Invention At a platform of collection of domestic waste and the like, open top containers were provided to an operator, which had been previously loaded with wastes which are not collected by waste sorting comprising a mixture of plastic materials, mainly containing solid residues derived from items made of plastic materials non-recoverable in the recycling chain of plastic materials according to the current technological standards, such as for example toys, writing material made of plastic materials, flip-flops, bins and baskets made of plastic, fruit crates, pipes, tables and chairs made of plastic, garden furniture, buckets, washbowls and basins, cases for audiocassettes, etc.

As it is known, the above-mentioned items are mainly made of plastic material based on polyolefin thermoplastic polymers, specifically polyethylene and polypropylene.

An operator took from the above open top containers residues made of plastic material, mainly comprising hard plastics, avoiding as much as possible to insert fractions or objects consisting of PVC (cables and laminates), as well as fractions of incidental, undesired materials such as wood, tissues and metals.

The plastic material which was thus taken was accumulated in an open top container, providing a mixed waste material containing a mixture of plastic materials, the latter comprising at least a plastic material based on a polyolefin thermoplastic polymer.

The mixed waste material was loaded onto a conveyor belt to be firstly deprived of further fractions consisting of PVC, as well as fractions made of incidental, undesired materials.

Below, the mixed waste material was sent to a single-shaft waste grinder, for a first grinding step which reduced the material to a size of about 60 mm.

Said first grinding step allows to obtain a mixed waste material which is easier to handle and has a homogeneous particle size for subsequent processing.

Below, the material so ground was distributed onto a conveyor belt to a station of magnetically-operated separation.

A ferrous fraction was then separated from said waste mixed material; following this procedure a weight loss of about 3% on the total weight of the material was recorded.

The mixed waste material thereby iron-deprived was fed, by means of a conveyor belt, to an induced current separator capable to separate non-magnetic metals, including aluminum, stainless steel and copper.

Following said step of removing non-ferrous metallic residues, a further weight loss of about 2% on the total weight of the material was recorded.

By means of the conveyor belt, the metal-free material was sent to the washing and separation section.

Together with the material at issue, in a tank on purpose arranged for carrying out the step of washing and density separation, the mixed waste material was fed together with a second mixture of plastic material comprising at least one plastic material based on a polyolefin thermoplastic polymer.

The second mixture of plastic material was in form of scrap from processes of recovery of recyclable waste made of plastic material or composite material, disposed and recovered in the collection based on waste sorting of plastic.

The weight of second mixture of plastic material corresponded to 25% by weight on the total weight of the mixed waste material depleted of the metallic fraction to which it has been added.

The percentage by weight of polyolefins in the plastic material constituting the second mixture, as such and/or possibly reinforced with mineral charges mixed in the plastic material, was higher than 85% by weight on the dry weight of the latter.

The mixed waste material was thus enriched with clean polyolefin materials derived from procedures of plastics recycling and mixed therewith.

The mixed waste material thus enriched with polyolefin materials of interest (polyethylene and polypropylene, in particular) was separated by means of a technique of density separation from the component with the highest molecular weight, specifically from residues of plastic material, and not only, having density higher than 1.1 kg/m$^3$, using an aqueous solution having a value of density higher than the plastic materials of particular interest, i.e. high density polyethylene, low-density polyethylene and polypropylene, but lower than plastic materials comprised in said mixed waste material and having a density value higher than the density of the plastic materials of interest.

Together with the above listed materials, the portion of low-density material thereby obtained comprised also polystyrene and expanded polystyrene.

The non-plastic inert materials and the plastic material with density higher than 1.1 kg/m³, such as nylon ropes or polyvinyl chloride and/or polyethylene terephthalate residues, were allowed to decant, precipitating onto the bottom of the tank.

The weight of the portion of material of highest density so separated corresponded to about 21% by weight on the total weight of the mixed waste material introduced into the washing and separation tank.

In the upper part of the tank, thanks to the movement of a comb-type rostrum placed slightly off the water, the residues of low-density material were easily separated from residues of higher density material, possibly stuck with them. The comb-type rostrum also moved the floating material to a zone of the tank in correspondence with a drained screw, placed at the water outlet.

By means of the screw, the portion of low-density material was then sent to the step of further grinding, while the size of the material was reduced to about 13 mm by means of a wet granulator. The material so ground was collected in containers.

The portion of low-density material so ground and collected was then sent to a horizontal centrifuge for drying the material; specifically, the material was introduced in a hopper and then it was delivered into a perforated basket, inside which a blade rotor was let rotate at a very high speed, so as to transmit a strong acceleration to the material, the residual humidity being expelled from the holes of the perforated basket.

The material thereby deprived of a part of humidity was then further dried by means of a fan.

The portion of low-density material thereby dried had the composition and physical characteristics showed in the following Table 1:

TABLE 1

| | |
|---|---|
| Content of polyolefins as such and/or reinforced with mineral charges | Higher than 90% by weight on the total dry weight |
| Content of other plastics, composite materials also comprising Al foils with thickness ≤ 50 μm and other materials | Lower than 10% by weight on the total dry weight |
| Volumetric mass on the dry | Higher than 100 Kg/m³ |
| Particle size | 13 mm |
| Physical form | Chips and granules of different forms |
| Humidity | Less than 10% by weight |

The portion of low-density material so obtained had thus the characteristics requested by the UNI standard 10667-16, therefore it was potentially usable as ground material for extrusion processes and/or for injection molding.

In addition, the portion of low-density material thereby dried had the physical and rheological characteristics showed in the following Table 2:

TABLE 2

| | |
|---|---|
| Density | 0.8 g/cm³ (determined according to the DIN 55990 procedure) |
| Melt flow index (MFI) | 2.5 g/10 min (calculated with procedure ISO 1133 with T = 190° C. and load equal to 2.16 kg) |

The dry material was sent by means of pneumatic transport in a mixing silo of 20 cubic meter capacity in which it was homogenized and mixed with a recycled material provided as post-consumer recovery material based on polyvinyl butyral, in particular the recycled material comprising a quantity equal to 90% by weight of polyvinyl butyral on its total weight.

The weight of the recycle material added corresponded to 10% by weight on the total weight of the portion of low-density material thereby dried.

During homogenizing and mixing, the materials were subjected to grinding at room temperature by means of knife mills until reaching a particle size of about 5 mm.

Finally, the material so obtained was sent to a subsequent step of pulverization and then fed to a disk grinding chamber, where it was ground and in which granules sizes are determined by the distance between the discs. Such distance is adjustable from the outside of the grinding chamber.

The additive mixture so obtained had the composition and physical characteristics showed in the following Table 3:

TABLE 3

| | |
|---|---|
| Content of plastic matter (and, possibly, rubber); of which: | 98.6% by weight on the total dry weight |
| polyolefins as such and/or reinforced with mineral charges; | 82.7% by weight on the total dry weight |
| polyvinyl butyral; | 8.2% by weight on the total dry weight |
| other plastics | 7.7% by weight on the total dry weight |
| Content of other materials (paper, cardboard, wood, glass, metal, stones, etc). | 1.4% by weight on the total dry weight |
| Apparent volumetric mass | 0.25 g/cm³ (calculated with UNI EN ISO 61 procedure) |
| Particle size | 1.2 mm |
| Physical form | Fine granules |
| Humidity | Lower than 10% by weight |

The portion of low-density material so obtained had thus the characteristics provided by the UNI standard 10667-14, therefore it was usable as mixture of recycle polymeric materials and of other materials, such as aggregates in cement mortars, in bitumen and in asphalt.

Finally, the additive mixture was sent to a silo provided with a pneumatic recirculation for a potential mixing with further modifying compounds capable of conferring specific properties to the resulting additive mixture comprising the present additive composition and the further modifying compound. The resulting additive mixture may be advantageously employed as modifying agent for road bituminous conglomerates.

Example 2: Formulation of a Bituminous Conglomerate Mixture with the Additive Composition Obtainable by the Present Process Using the additive composition according to Example 1, an appropriate number of briquettes of bituminous conglomerate with a diameter of 100 mm and a thickness of about 25 mm, containing the composition according to the proportions of the ingredients indicated in the following Table 4, were prepared in the laboratory.

TABLE 4

| Materials | Parts by weight |
|---|---|
| Inerts grit 12/20 | 25 |
| Inerts grit 6/12 | 35 |
| Inerts grit 3/6 | 10 |

TABLE 4-continued

| Materials | Parts by weight |
|---|---|
| Sand 0/4 | 25 |
| Filler (CaCO$_3$) | 5 |
| Bitumen 70/100 | 4.5 |
| Additive composition | 0.27 |
| Total | 104.77 |

The bituminous conglomerate comprising all the components according to the recipe provided in Table 4 was prepared in laboratory by means of the procedure that follows, using devices which simulate, in function, machinery on higher scale, usually used in plants for the production of bituminous conglomerate:
- selecting a granulometric curve, depending on the road paving which is desired to be made with the bituminous conglomerate currently under preparation;
- selecting aggregates according to the above-mentioned granulometric curve, in the present case the aggregates according to Table 4, and heating the aggregates up to a temperature of 170-180° C. inside a mixer;
- adding an appropriate quantity of additive composition, then mixing for 40-60 seconds so as to obtain a blend;
- adding to the blend an appropriate quantity of bitumen, in the present case the quantity expressed in Table 4, then mixing for at least 20-30 seconds;
- adding to the blend an appropriate quantity of filler, in the present case the quantity expressed in Table 4, then mixing for at least 5 minutes (as provided by the regulation EN 12697-35), obtaining a homogeneous blend of bituminous conglomerate.

Specifically, the blend was maintained at a temperature between 170 and 180° C. during all the steps of processing thereof.

The blend of bituminous conglomerate so obtained appeared as a single bitumen-based dispersing phase, having a viscous appearance, in which the aggregates were homogeneously dispersed.

The blend of bituminous conglomerate so obtained was then discharged from the mixer, dosed in a quantity equal to about 1210 g in containers and subsequently it was conditioned in oven at a temperature of 150° C. for about 3 hours (the conditioning was performed only to simulate the transportation conditions).

The bituminous conglomerate so obtained, after the step of oven conditioning, was then inserted inside a template. Then, in order to obtain a voids percentage of about 2.5%, a compaction by means of gyratory compactor was performed (alternatively to the gyratory compactor it is possible to use any other type of compactor suitable for the purpose, for example a Marshall compactor):
- Load pressure: 600 kPa;
- Gyratory angle: 1.25°;
- Limit density: 2400 kg/m$^3$.

An appropriate number of briquettes were made for performing the mechanical tests; finally, said briquettes were placed in climatic chambers for the appropriate conditioning for performing the mechanical tests.

Example 3: Performing the Mechanical Tests

An appropriate number of briquettes to obtain a reproducible result were respectively housed in a mechanical press of the designated test basket, then a tensile strength test was performed according to the methodology UNI EN 12697-23.

The mechanical characterization occurred with the Indirect Tensile Strength (ITS). The ITS simulates the maximum stress generated by vehicle passage which can be tolerated by the road pavement. The Indirect Tensile Strength was evaluated through the relative parameter ITS.

The mean of the results of the individual tests showed an ITS (MPa) in connection with the conglomerate obtainable by using the additive composition according to the present invention which was completely satisfying, equal or higher if compared to bituminous conglomerates obtainable by using conventional additives.

After that, a test was performed for determining the stiffness modulus, meant as capability of bituminous conglomerates to propagate in the superstructure the load exerted in the road surface from the track areas of the vehicle tires.

An appropriate number of briquettes to obtain a reproducible result were placed on a designated housing of a servo-pneumatic system for dynamic tests, which was in turn contained in a climatic cell for temperature control; subsequently, a test for the determination of the stiffness modulus was performed according to the methodology UNI EN 12697-26.

The test conditions used for the determination of the stiffness modulus were:
- Temperature: variable;
- Imposed horizontal strain: 5 µm;
- Peak time: 124 ms (frequency 2 Hz);
- Poisson Coefficient: 0.35.

The mean of the results of the individual tests showed a stiffness (MPa) of the samples at different temperatures (T=5° C., T=20° C. and T=40° C.) in connection with the conglomerate obtainable by using the additive composition according to the present invention which was completely satisfying, equal or higher if compared to bituminous conglomerates obtainable by using conventional additives.

The above-mentioned tests thus showed the absolute efficacy of the additive composition obtainable by the process according to the present invention to obtain a bituminous conglomerate mixture with high mechanical performances; the so-obtained bituminous conglomerate can be used to provide a resistant and performing road paving.

The invention claimed is:
1. A process for the production of an additive composition intended to be mixed into a bituminous conglomerate for road paving comprising:
   a) providing a mixed waste material containing a mixture of plastic materials, wherein the mixture of plastic materials comprises a plastic material based on a polyolefin thermoplastic polymer;
   b) grinding the mixed waste material until reaching a particle size between 40 mm and 80 mm;
   c) washing the ground mixed waste material and separating a portion of low-density material from the mixed waste material, wherein the portion of low-density material comprises the plastic material based on a polyolefin thermoplastic polymer;
   d) grinding the portion of low-density material until reaching a particle size between 10 mm and 20 mm; and
   e) mixing the ground portion of low-density material with a material based on polyvinyl butyral and further grinding the mixture in order to produce an additive composition having a particle size between 4 mm and 6 mm;

wherein step c) of washing and separation is carried out by means of a technique of density separation, selecting a predetermined limit density value and separating from the mixed waste material a portion of low-density material having a density lower or equal to said limit value, the predetermined limit density value being lower than or equal to 1.2 kg/m$^3$.

2. The process according to claim 1, wherein in the step a) of providing a mixed waste material, the mixed waste material comprises solid residues made of plastic material, which result from urban solid wastes or from industrial or handcrafted productions of items made of plastic material or any combination thereof, the solid residues being not recovered or not recoverable in the recycling chain of plastic materials.

3. The process according to claim 1, wherein in step a) of providing a mixed waste material, the mixture of plastic materials comprises plastic materials comprising a polymer selected from the group consisting of polyethylene, a polyethylene co-polymer, polypropylene, a polypropylene co-polymer, polyethylene terephthalate, polyvinyl chloride, acrylonitrile butadiene styrene, polycarbonate, polystyrene, polyurethane and any combination thereof.

4. The process according claim 1, wherein in the step a) of providing a mixed waste material, the polyolefin thermoplastic polymer is selected from the group consisting of polyethylene, a polyethylene co-polymer, polypropylene, a polypropylene co-polymer and any combination thereof.

5. The process according to claim 1, wherein the mixed waste material is previously subjected to a preliminary step of separation during which possible fractions made of polyvinyl chloride and/or fractions made of unwanted materials such as paper, cardboard, wood, fabrics, metal or glass are removed.

6. The process according to claim 1, wherein in the step b) of grinding, the ground mixed waste material is subjected to a procedure of separating a metallic fraction.

7. The process according to claim 1, wherein the predetermined limit density value is lower than or equal to 1.1 kg/m$^3$.

8. The process according to claim 6, wherein the portion of low-density material has an average density between 0.65 kg/m$^3$ and 0.95 kg/m$^3$, as determined according to the DIN 55990 procedure.

9. The process according to claim 1, wherein the portion of low-density material comprises a plastic material based on a polyolefin thermoplastic polymer in a quantity higher than or equal to 75% by weight on the total weight of the portion of low-density material.

10. The process according to claim 1, wherein in the step c) of washing and separating, a second mixture of plastic materials comprising a plastic material based on a polyolefin thermoplastic material is added and mixed with the mixed waste material.

11. The process according to claim 10, wherein the second mixture comprises a quantity equal to at least 75% by weight of its total weight of the plastic material based on a polyolefin thermoplastic material.

12. The process according to claim 10, wherein the second mixture of plastic materials comprises residues made of plastic material from recoverable wastes, which are recyclable and are collected by waste sorting.

13. The process according to claim 10, wherein the second mixture of plastic materials is added to the mixed waste material in a quantity between 5-35% by weight on the weight of the mixed waste material.

14. The process according to claim 1, wherein the material based on polyvinyl butyral comprises a quantity of polyvinyl butyral higher than or equal to 80% by weight on the total weight of the material based on polyvinyl butyral, the material based on polyvinyl butyral being a recovery material based on polyvinyl butyral resulting from post-consumer waste items including automotive windscreens, double-glazed windows, panes of thermal glass, panes of safety glass and/or results from swarf from industrial manufacturing for the production of the post-consumer waste items.

15. The process according to claim 14, wherein the material based on polyvinyl butyral is added to the portion of low-density material in a quantity equal to 5-25% by weight on the weight of said portion of low-density material.

16. The process according to claim 1, comprising an additional step of mixing the additive composition with a modifier compound, wherein the modifier compound is selected from graphene, an adhesion enhancer, a regenerating agent, a plasticizer, lignin or any combination thereof.

17. The process according to claim 1 comprising the following additional steps:

feeding the additive composition in an extruder;
heating the additive composition up to a predetermined temperature;
extruding and cooling the additive composition in order to obtain an additive composition in form of extruded granules having a particle size between 1.85 mm and 4.5 mm.

18. The process according to claim 1, comprising an additional step of further grinding the additive composition in order to obtain an additive composition in form of fine granules having a particle size between 0.85 mm and 2.5 mm.

19. The process according to claim 18, comprising the following additional steps:

dosing a predetermined quantity of the additive composition in form of fine granules and pressing it;
coating the pressed additive composition with a plastic material film which is based on a thermoplastic polymer, thus obtaining a capsule.

20. The process according to claim 19, wherein the step of dosing comprises a step of adding to the additive composition a predetermined quantity of a liquid modifier compound, the liquid modifier compound being selected from an adhesion enhancer, a regenerating agent, a plasticizer, lignin or any combination thereof.

* * * * *